March 14, 1933.  W. D. MacCOURT ET AL  1,901,661
REFLECTIVE DISPLAY DEVICE
Filed April 2, 1931  2 Sheets-Sheet 1
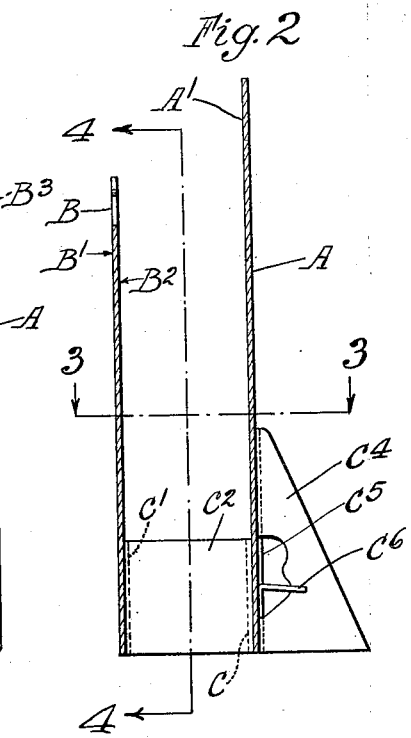
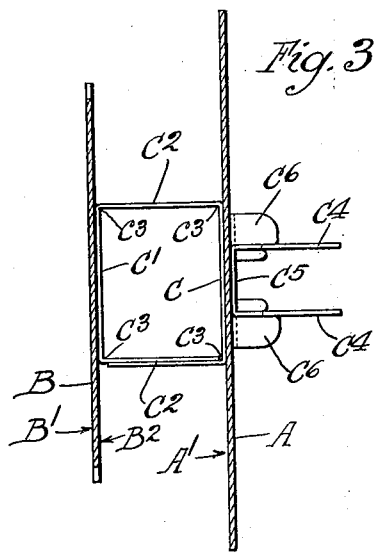
Inventors
Winthrop D. MacCourt
Tom F. Walsh
Frank H. Rasmussen
by Parker Harter
Attorneys.

March 14, 1933.  W. D. MacCOURT ET AL  1,901,661
REFLECTIVE DISPLAY DEVICE
Filed April 2, 1931   2 Sheets-Sheet 2
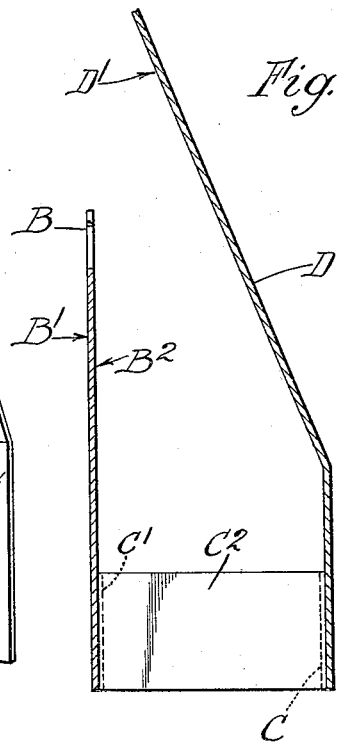
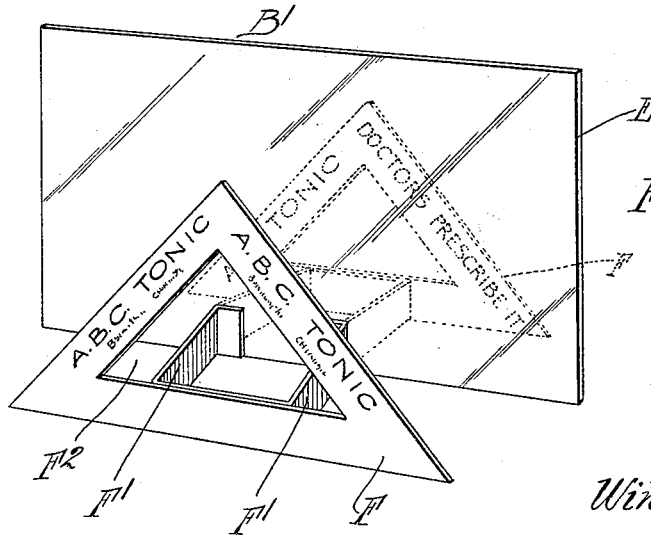
Inventors
Winthrop D. MacCourt
Tom F. Walsh
Frank H. Rasmussen
by Parker & Carter
Attorneys.

Patented Mar. 14, 1933

1,901,661

UNITED STATES PATENT OFFICE

WINTHROP D. MacCOURT, TOM F. WALSH, AND FRANK H. RASMUSSEN, OF CHICAGO, ILLINOIS, ASSIGNORS TO MAGILL-WEINSHEIMER COMPANY, OF CHICAGO, ILLINOIS, A CORPORATION OF ILLINOIS

REFLECTIVE DISPLAY DEVICE

Application filed April 2, 1931. Serial No. 527,274.

Our invention relates to an improvement in display devices and has for one object the provision of a display device which may for example be used for advertising purposes. One purpose is the provision of a display device which adds to the normal face of a display member a reflection of the rear of the member which is normally concealed from the eye of the observer. Another object of our invention is to provide a third dimensional effect or in other words to obtain the effect of perspective. For example an article or representation intended to be seen as appearing to be at some distance back of the foreground may be indicated on the back face of the display member so that when reflectively seen by the observer the rear element or article or representation seems more remote from the eye than the front article and thus an effect approximating perspective may be obtained. Other objects will appear from time to time in the course of the specification and claims.

We illustrate our invention more or less diagrammatically in the accompanying drawings, wherein—

Figure 1 is a front elevation;

Figure 2 is a vertical section;

Figure 3 is a sectional on the line 3—3 of Figure 2;

Figure 4 is a section on the line 4—4 of Figure 2;

Figure 5 is an elevation of a variant form of the device;

Figure 6 is a vertical section through the variant form; and

Figure 7 illustrates a modified form in which the display element is provided with an opening, through which the reflection may be seen.

Like parts are indicated by like symbols throughout the specification and drawings.

Referring first to the form of Figures 1 to 4, A generally indicates a back or base member, the forward face of which is reflective, as shown at $A^1$ in Figure 1. We may employ for example a mirror, or a card of board, fiber or the like which is faced with metal foil, metallic paint or similar reflecting substances, but we wish it to be understood that we may employ any suitable material or make the rear member reflective by any suitable means.

Positioned forwardly of the reflective member A is the display element proper, generally indicated as B in Figures 1 to 4. The member B may be provided on its forward face $B^1$ with any desired showing, illustrations, figures, descriptive matter, symbols, or the like, which are directly visible to the eye of the observer. The rear face of the member B, as shown at $B^2$ in Figure 4 may be provided with differing illustrative material. This differing material may be reflected, as shown at $B^3$ in Figure 1, upon the reflective surface $A^1$ of the member A, such reflection being visible either through an aperture in the member B or around its edges. Thus, the observer, when he looks at the device, sees both the directly visible forward impression $B^1$ and the reflectively visible rear impression $B^2$. As a practical example of our invention we illustrate in Figures 1 and 4 a forward member B which is cut in an outline having reference to or helping complete a pictorial representation. The pictorial representation, front and rear, differs somewhat. For example the child shown on the front impression $B^1$ is shown as smiling, while the child shown on the rear impression $B^2$ is indicated as crying. Thus the observer may get a "before and after" effect as for instance, applied, for advertising purposes, to a child taking the particular medicine, food, beverage, or other products, which may happen to be advertised. This is of course merely an illustration of the invention and the forward member B need not of necessity be cut into the outline of the picture.

The member B may be positioned forwardly of the member A as by the bracket structure which includes a portion C glued to the forward face of the member A and a portion $C^1$ glued to the rear face of the member B, the two being connected by hinged link members $C^2$. If the connected device is formed of cardboard or fiber the hinged effect may be obtained by merely bending or scoring or creasing the fiber at the corners $C^3$. The connecting member so formed may be positioned at the bottoms of the members A and B, so that it can perform the double function of a connection and spacing means between them, and of a support for the article as a whole. If desired an additional rear bracket of any suitable form may be provided as in the form of the hinged members C⁴ hinged to the base C⁵ which may be secured to the rear of the member A. C⁶ indicate locking flaps whereby the brackets so formed may be held in position.

Under some circumstances it may be desirable angularly to offset part or all of the rear member, as shown in Figures 5 and 6. In those figures we indicate an inclined portion D with a reflective forward face D¹ which may be set at such an angle as to place the reflective impression of the rear of the member B in such a position as to be visible to the observer, over the top, under the bottom, or along either side of the member B.

In Figure 7 is shown a modified form of the device in which the member which carries the image that is to be reflected is provided with an opening or perforation. By this means an observer may see the reflected image directly through the member. In this form of the invention the construction of the device is generally the same as that shown and described in connection with the other forms. A reflective member E is used and to it is attached an advertising member F. Advertising text or designs or any suitable matter is placed upon the front and back of the member F. Obviously of course it might be omitted from the front but it will ordinarily be used on both sides. The member F is fastened to the reflective member by supporting and attaching parts F¹ F¹ and is provided with an opening or perforation F² through which the observer may look directly at the reflective surface and consequently see the reflected image on the reflected surface as indicated in Figure 7.

It will be realized that whereas we have described and claimed a practical and operative device, nevertheless many changes may be made in size, shape, number, material and disposition of parts without departing from the spirit of our invention. We wish our drawings, therefore, to be taken as in a broad sense illustrative or diagrammatic rather than as limiting us to our description and showing. For example, any suitable material may be substituted for the fiber or card that is covered by the metal foil. Any suitable spacing or supporting means may be employed for supporting the two parts in spaced relationship.

We claim:

1. In a display device, a flat display member having illustrative material on the forward and rear faces thereof, and a reflective member positioned to the rear of said display member and adapted to reflect, to the eye of an observer, the rear face of the display member, both the direct and the reflective images being simultaneously observable by the observer, and combined spacing and supporting means adapted to maintain the display member and the reflective member in spaced relationship, and additional means for maintaining the reflective member in upright position.

2. In a display device, a flat display member having illustrative material on the forward and rear faces thereof, and a reflective member positioned to the rear of said display member and adapted to reflect, to the eye of an observer, the rear face of the display member, both the direct and the reflective images being simultaneously observable by the observer, said reflective member including a base of fibrous material and a reflective surface of metal foil.

3. In a display device, a flat display member having illustrative material on the forward and rear faces thereof, and a reflective member positioned to the rear of said display member and adapted to reflect, to the eye of an observer, the rear face of the display member, both the direct and the reflective images being simultaneously observable by the observer, the reflective member having a portion positioned out of parallelism with the plane of the display member and extending above the top of said display member.

4. In a display device, a flat display member of fibrous material having illustrative matter on both the forward and the rear faces thereof, a back member of fibrous material positioned to the rear thereof and being provided with a reflective surface adapted to reflect, to the eye of an observer, the rear face of the display member, both direct and reflective images being observable simultaneously by the observer, connected spacing means hingedly secured to and extending between the display member and back for horizontal swinging movement, adapted to maintain the display member and the flat back in predetermined position with their lower edges in parallelism and spaced apart, said lower edges being adapted to engage any suitable plane surface upon which the device is positioned and to support the device in upright position, the hinged connecting means permitting folding of the display member against the face of the back member.

5. In a display device, a flat display member of fibrous material having illustrative matter on both the forward and the rear faces thereof, a back member of fibrous material positioned to the rear thereof and being provided with a reflective surface adapted to reflect, to the eye of an observer, the rear face of the display member, both direct and reflective images being observable simultaneously by the observer, connected spacing means secured to and extending between the dispay member and back, adapted to maintain the display member and the flat back in predetermined position with their lower edges in parallelism and spaced apart, said lower edges being adapted to engage any suitable plane surface upon which the device is positioned and to support the device in upright position, and additional means for maintaining the device in upright position, including an easel member secured to the rear of the back member.

6. In a display device, a display member having illustrative material on the rear face thereof and being provided with an opening of appreciable size therethrough, and a reflecting member positioned to the rear of said display device and adapted to reflect to the eye of an observer the rear face of the display member, both the direct and reflective images being simultaneously observable by the observer and portions of the reflected image being observable through the opening in the display member.

Signed at Chicago, in the county of Cook and State of Illinois, this 28th day of March, 1931.

WINTHROP D. MacCOURT.
TOM F. WALSH.
FRANK H. RASMUSSEN.